US010879526B2

(12) United States Patent
Li et al.

(10) Patent No.: US 10,879,526 B2
(45) Date of Patent: Dec. 29, 2020

(54) CONFORMAL GRAPHENE CAGE ENCAPSULATED BATTERY ELECTRODE MATERIALS AND METHODS OF FORMING THEREOF

(71) Applicant: The Board of Trustees of the Leland Stanford Junior University, Stanford, CA (US)

(72) Inventors: Yuzhang Li, Stanford, CA (US); Kai Yan, Stanford, CA (US); Zhenda Lu, Stanford, CA (US); Yi Cui, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 104 days.

(21) Appl. No.: 15/178,366

(22) Filed: Jun. 9, 2016

(65) Prior Publication Data
US 2016/0365573 A1 Dec. 15, 2016

Related U.S. Application Data

(60) Provisional application No. 62/175,148, filed on Jun. 12, 2015.

(51) Int. Cl.
*H01M 4/82* (2006.01)
*H01M 6/00* (2006.01)
(Continued)

(52) U.S. Cl.
CPC .......... *H01M 4/366* (2013.01); *H01M 4/049* (2013.01); *H01M 4/0471* (2013.01);
(Continued)

(58) Field of Classification Search
None
See application file for complete search history.

(56) References Cited

U.S. PATENT DOCUMENTS

| 2011/0111303 A1* | 5/2011 | Kung | H01B 1/18 429/231.8 |
| 2012/0328923 A1* | 12/2012 | Sawai | H01M 4/13 429/94 |

(Continued)

OTHER PUBLICATIONS

Chen et al., "Three-dimensional flexible and conductive interconnected graphene networks grown by chemical vapour deposition", Nature Materials vol. 10, Jun. 2011, pp. 424-428. (Year: 2011).*

(Continued)

*Primary Examiner* — Cynthia H Kelly
*Assistant Examiner* — Julian Anthony
(74) *Attorney, Agent, or Firm* — Sheppard Mullin Richter & Hampton LLP

(57) ABSTRACT

A conformal graphene-encapsulated battery electrode material is formed by: (1) coating a battery electrode material with a metal catalyst to form a metal catalyst-coated battery electrode material; (2) growing graphene on the metal catalyst-coated battery electrode material to form a graphene cage encapsulating the metal catalyst-coated battery electrode material; and (3) at least partially removing the metal catalyst to form a void inside the graphene cage.

9 Claims, 13 Drawing Sheets

(51) Int. Cl.

| | |
|---|---|
| *H01M 4/13* | (2010.01) |
| *H01M 4/58* | (2010.01) |
| *H01M 4/36* | (2006.01) |
| *H01M 4/62* | (2006.01) |
| *H01M 4/38* | (2006.01) |
| *H01M 4/48* | (2010.01) |
| *H01M 4/04* | (2006.01) |
| *H01M 4/134* | (2010.01) |
| *H01M 4/02* | (2006.01) |
| *H01M 10/052* | (2010.01) |

(52) U.S. Cl.
CPC ......... *H01M 4/0492* (2013.01); *H01M 4/134* (2013.01); *H01M 4/386* (2013.01); *H01M 4/387* (2013.01); *H01M 4/483* (2013.01); *H01M 4/625* (2013.01); *H01M 10/052* (2013.01); *H01M 2004/021* (2013.01)

(56) References Cited

U.S. PATENT DOCUMENTS

| | | | |
|---|---|---|---|
| 2013/0134361 A1 | 5/2013 | Lee et al. | |
| 2014/0255785 A1* | 9/2014 | Do | C09D 1/00 429/231.8 |
| 2014/0272610 A1 | 9/2014 | Amine et al. | |
| 2015/0333319 A1* | 11/2015 | Kawamura | H01M 4/364 252/506 |

OTHER PUBLICATIONS

Chang, J. et al. (2013) "Multilayered Si Nanoparticle/Reduced Graphene Oxide Hybrid as a High-Performance Lithium-Ion Battery Anode," Adv Mater. 26:758-764.

Chou, S-L. et al. (2009) "Enhanced reversible lithium storage in a nanosize silicon/grapheme composite," Electrochemistry Communications 12:303-306.

Luo, J. et al. (2012) "Crumpled Graphene-Encapsulated Si Nanoparticles for Lithium Ion Battery Anodes," J Phys Chem Lett. 3:1824-1829.

Wilson, P.M. et al. (2014) "Three-dimensional periodic grapheme nanostructures," J Mater Chem. C 2:1879-1886.

Wu, P. et al. (2014) "Three-Dimensional Interconnected Network of Graphene-Wrapped Porous Silicon Spheres: In Situ Magnesiothermic-Reduction Synthesis and Enhanced Lithium-Storage Capabilities," ACS Appl Mater Interfaces 6:3546-3552.

Xiang, H. et al. (2011) "Graphene/nanosized silicon composites for lithium battery anodes with improved cycling stability," Carbon 49:1787-1796.

Zhou, X. et al. (2012) "Facile synthesis of silicon nanoparticles inserted into graphene sheets as improved anode materials for lithium-ion batteries," Chem Commun. 48:2198-2200.

Zhou, X. et al. (2012) "Self-Assembled Nanocomposite of Silicon Nanoparticles Encapsulated in Graphene through Electrostatic Attraction for Lithium-Ion Batteries," Adv Energy Mater. 2:1086-1090.

* cited by examiner

CONFORMAL GRAPHENE CAGE ENCAPSULATED BATTERY ELECTRODE MATERIALS AND METHODS OF FORMING THEREOF

CROSS-REFERENCE TO RELATED APPLICATION

This application claims the benefit of U.S. Provisional Application No. 62/175,148, filed on Jun. 12, 2015, the disclosure of which is incorporated herein by reference in its entirety.

STATEMENT REGARDING FEDERALLY SPONSORED RESEARCH OR DEVELOPMENT

This invention was made with Government support under contract DE-AC02-76SF00515 awarded by the Department of Energy. The Government has certain rights in the invention.

TECHNICAL FIELD

This disclosure generally relates to conformal graphene cage encapsulated materials and, more particularly, conformal graphene cage encapsulated battery electrode materials.

BACKGROUND

Rechargeable lithium-based batteries with high energy density have been intensely investigated to meet the ever-growing demands of portable electronics and electrical vehicles. A variety of emerging anode and cathode materials have attracted much attention, including silicon (Si), tin (Sn), and lithium (Li) metal for anodes, and sulfur (S) and oxygen ($O_2$) for cathodes. Among these materials, Si is an attractive anode material for next-generation lithium-ion batteries (LIBs), having greater than about ten times the theoretical capacity of commercial graphite anodes. However, challenges arise due to the large volume expansion of Si (about 300%) during battery operation, causing (1) mechanical fracture, (2) loss of inter-particle electrical contact, and (3) repeated chemical side reactions with an electrolyte.

It is against this background that a need arose to develop the embodiments described in this disclosure.

SUMMARY OF DISCLOSURE

Some aspects of this disclosure relate to a method of forming a conformal graphene-encapsulated material. In some embodiments, the method includes: (1) coating a battery electrode material with a metal catalyst to form a metal catalyst-coated battery electrode material; (2) growing graphene on the metal catalyst-coated battery electrode material to form a graphene cage encapsulating the metal catalyst-coated battery electrode material; and (3) at least partially removing the metal catalyst to form a void inside the graphene cage.

Additional aspects of this disclosure relate to a conformal graphene-encapsulated material. In some embodiments, the graphene-encapsulated material includes: (1) a graphene cage defining an internal volume; and (2) a battery electrode material disposed within the internal volume, where the battery electrode material occupies less than 100% of the internal volume to define a void.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

DETAILED DESCRIPTION

Figure 1:
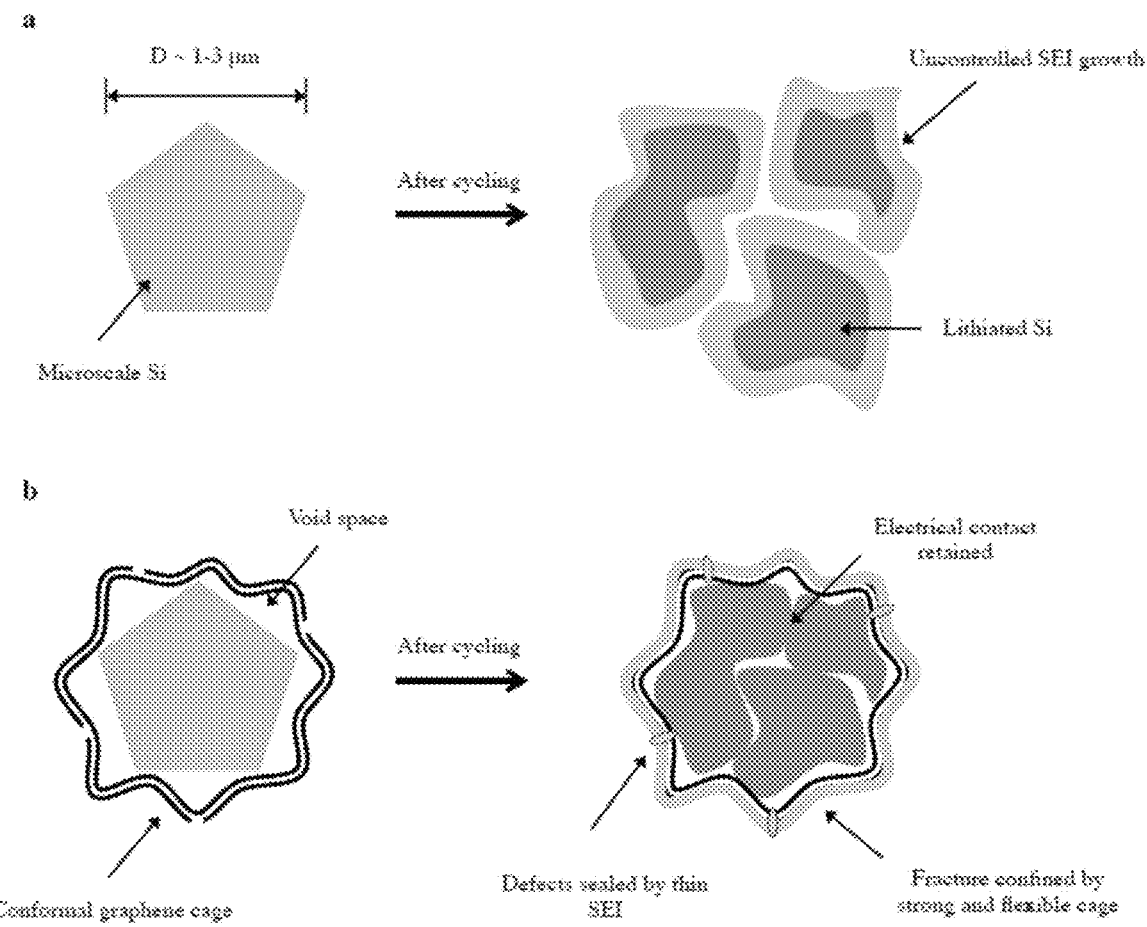
FIG. 1: Design and structure of graphene cage encapsulation. a, Si microparticles fracture and lose electrical contact during repeated battery cycling. Freshly exposed surfaces of Si continually react with an electrolyte, resulting in a thick and ionically insulating solid electrolyte interface (SEI) layer. The destruction of electrical and ionic pathways leads to severe battery performance decay. b, The graphene cage imparts its mechanical strength, electrical conductivity, and chemical stability to microscale Si, addressing its major challenges. The mechanically flexible graphene cage confines the expansion and fracture of Si microparticles, while remaining intact to electrically connect the ruptured particles. Conductive additives are unnecessary even for thick electrodes due to the graphene cage's high electrical conductivity. Efficient SEI formation on the graphite-like surface of the graphene cage reduces irreversible Li ion loss, resulting in high initial and later-cycle Coulombic efficiency and fast charge-transfer kinetics at the surface. These features allow stable cycling of Si microparticles.

Nanostructuring has generated significant progress in addressing the problems of high capacity Si anodes. However, Si nanomaterials are still at high cost and not yet scalable due to complex synthesis processes, and issues with poor Coulombic efficiencies of nanostructured Si remain. The low Coulombic efficiencies of nanostructured Si can be caused by a large surface area available to form a solid electrolyte interface (SEI), and, when coated with amorphous carbon, can be caused by irreversible trapping of Li by dangling bonds of the amorphous carbon coating. Micron-sized Si particles (or Si microparticles or SiMP) are low-cost alternatives, but suffer from particle fracture during electrochemical cycling, leading to severe battery capacity decay.

Here, some embodiments are directed to encapsulating SiMPs using conformally synthesized cages of multi-layered graphene, a material that is mechanically strong, electrically conducting, and largely chemically inert. Advantageously, these desirable properties allow SiMP, for which stable cycling was previously a challenge, to have excellent battery performance. The graphene cage acts as a strong and flexible buffer during deep galvanostatic cycling, allowing the low-cost SiMP (e.g., about 1-3 μm) to expand and fracture within the cage while retaining electrical connectivity on both the particle and electrode level. Without the use of conductive additives, graphene-encapsulated SiMP exhibits the longest cycle life (e.g., at least about 85% capacity retention after 300 cycles) and highest areal capacity (e.g., at least about 5.2 mAh/cm$^2$) reported for microscale Si. Furthermore, the graphene cage forms a chemically stable SEI, resulting in first-cycle Coulombic efficiencies as high as about 93.2% (or more), and about 99.9% (or more)

within the first 10 cycles. By conferring favorable mechanical, electrical, and chemical properties to the composite, the conformal growth of the graphene cage demonstrates a strategy to overcome failure modes in energy storage materials.

More generally, some embodiments are directed to direct growth of conformal graphene cages or shells onto various materials. Graphene is a material with a wide range of desirable properties, including high mechanical strength and flexibility, electrical conductivity, and chemical stability. These properties can be successfully imparted to silicon (a lithium-ion battery active electrode material) by the conformal growth of graphene cages. This allows a previously impractical battery material to have excellent cycle life and battery performance. The graphene encapsulation strategy disclosed herein is applicable to other materials that suffer from failure modes during device operation. More generally in materials synthesis, the graphene encapsulation strategy can impart electrical conductivity, mechanical strength, and chemical stability to various materials. In energy applications, the graphene encapsulation strategy can allow energy storage materials with unstable morphologies to perform well during operation. In some embodiments, a conformal nickel catalyst coating is used for direct, low-temperature graphene growth. Operations in synthesis can be implemented by industrial processes that are readily scalable and readily adaptable to various materials. The graphene encapsulation strategy provides a graphene cage structure that simultaneously provides electrical conductivity, mechanical strength, and chemical stability to a composite. Moreover, the versatile strategy results in a highly conformal graphene cage and is successful even for particles with extremely non-uniform distributions of size and shape.

In some embodiments, a conformal graphene-encapsulated material includes particles of a material, such as a battery electrode material like silicon or other energy storage material, and hollow, encapsulating structures in the form of graphene cages, where one or more particles are disposed within each graphene cage. The battery electrode material (or other encapsulated material) can include, for example, one or more of carbon (C), graphite, silicon (Si), silicon monoxide (SiO), silicon dioxide ($SiO_2$), tin (Sn), and tin oxides. The graphene cages can have sizes (e.g., outer lateral dimensions) in the range of about 10 nm to about 100 µm, such as about 10 nm to about 200 nm, about 10 nm to about 500 nm, about 100 nm to about 800 nm, about 200 nm to about 10 µm, about 500 nm to about 3 µm, about 500 nm to about 10 µm, about 1 µm to about 10 µm, or about 10 µm to about 100 µm. Walls of the graphene cages can have a thickness in the range of about 0.5 nm to about 100 nm, such as about 1 nm to about 90 nm, about 1 nm to about 70 nm, about 1 nm to about 50 nm, about 1 nm to about 30 nm, about 1 nm to about 10 nm, or about 1 nm to about 5 nm, and can be composed of a single graphene layer or two or more graphene layers, such as three or more, four or more, five or more, six or more, and so forth. The graphene cages can be highly graphitic, as characterized by, for example, a percent crystallinity according to X-ray diffraction measurements of at least about 60%, at least about 70%, at least about 80%, at least about 90%, or at least about 95%, and up to about 97% or more, up to about 98% or more, or up to about 99% or more. Also, the graphene cages can be electrically conductive, as characterized by, for example, an electrical resistance of about 200 kΩ or less, about 150 kΩ or less, about 100 kΩ or less, about 50 kΩ or less, or about 20 kΩ or less, and down to about 17 kΩ or less, or down to about 15 kΩ or less. The battery electrode material (or other encapsulated material) is disposed within the graphene cages, with a void or an empty space remaining within an interior of each graphene cage. The battery electrode material can be provided as solid particles, such as solid micron-sized particles or microparticles, but also can be provided as nano-sized particles, nanowires, nanotubes, hollow particles, or inner shells. For example, the battery electrode material can be provided as particles having sizes (e.g., outer lateral dimensions) in the range of about 10 nm to about 100 µm, such as about 10 nm to about 200 nm, about 10 nm to about 500 nm, about 100 nm to about 800 nm, about 200 nm to about 10 µm, about 500 nm to about 3 µm, about 500 nm to about 10 µm, or about 1 µm to about 10 µm.

In some embodiments, each graphene cage defines an internal volume, and a battery electrode material (or other encapsulated material) is disposed within the internal volume and occupies about 100% of the internal volume. In other embodiments, each graphene cage defines an internal volume, and a battery electrode material (or other encapsulated material) is disposed within the internal volume and occupies less than about 100% of the internal volume, thereby leaving a void or an empty space inside the graphene cage to allow for expansion of the material. In some embodiments, such as for the case of a battery electrode material is its substantially delithiated state, a ratio of the volume of the void inside the graphene cage relative to the volume of the battery electrode material inside the graphene cage is in the range of about 1/20 to about 20/1, such as from about 1/10 to about 10/1, from about 1/10 to about 5/1, from about 1/10 to about 3/1, from about 1/10 to about 2/1, from about 1/10 to about 1/1, from about 1/5 to about 3/1, from about 1/5 to about 2/1, from about 1/5 to about 1/1, from about 1/3 to about 3/1, from about 1/3 to about 2/1, from about 1/3 to about 1/1, from about 1/2 to about 3/1, from about 1/2 to about 2/1, from about 1/2 to about 1/1, from about 2/3 to about 3/1, from about 2/3 to about 2/1, or from about 2/3 to about 1/1. In some embodiments, such as for the case of the battery electrode material is its substantially delithiated state, the volume of the void can be at least about 1/20 of the total internal volume inside the graphene cage, such as at least about 1/10, at least about 1/5, at least about 1/3, at least about 1/2, or at least about 2/3, with a remainder of the internal volume inside the graphene cage taken up by the battery electrode material. In some embodiments, each graphene cage is a monolithic or unitary encapsulating structure. The loading of the battery electrode material within the graphene cages can be controlled so that there is sufficient active material while ensuring enough empty space for the material to expand during lithiation. In some embodiments, a weight ratio of the battery electrode material relative to a combined mass of the battery electrode material and the graphene cages is in the range of about 1% to about 99%, such as from about 10% to about 99%, from about 30% to about 99%, from about 50% to about 99%, from about 70% to about 99%, from about 80% to about 95%, or from about 85% to about 95%.

In some embodiments, an extent of conformal coverage of a battery electrode material (or other encapsulated material) by graphene cages can be characterized according to X-ray photoelectron spectroscopy (XPS) or another surface spectroscopy technique. In the case of XPS, for example, an initial scan can be performed (without sputtering) to evaluate atomic composition of surfaces of a graphene-encapsulated material to a depth of up to about 2 nm, and surface atomic concentration ratios can be evaluated according to ratios of characteristic peak intensities. In some embodiments, a surface atomic concentration ratio of silicon (or other element included in the battery electrode material or other encapsulated material) relative to carbon (included in the graphene cages) can be about 1/10 or less, about 1/15 or less, about 1/20 or less, about 1/25 or less, about 1/30 or less, about 1/35 or less, or about 1/40 or less, and down to about 1/45 or less, or down to about 1/50 or less.

In some embodiments, a method of forming a conformal graphene-encapsulated material includes coating a material (to be encapsulated and serving as a substrate) with a metal catalyst to form a metal catalyst-coated material, growing graphene on the metal catalyst-coated material to form a graphene cage encapsulating the metal catalyst-coated material, and at least partially removing the metal catalyst to form a void inside the graphene cage. The metal catalyst can be, for example, nickel (Ni) or other suitable metal such as, for example, iron (Fe), cobalt (Co), or copper (Cu), or a metal alloy, and coating the material with the metal catalyst can be via, for example, electroless deposition or other deposition technique. Growing graphene can be via, for example, carburization, such as by immersing, exposing or otherwise contacting the metal catalyst-coated material with a carbon-containing source, followed by annealing, such as at a temperature in the range of about 100° C. to about 900° C., about 200° C. to about 700° C., about 300° C. to about 550° C., or about 400° C. to about 500° C., for about 10 min to about 5 h or about 0.5 h to about 3 h in an inert atmosphere. Growing graphene can be via, for example, decomposition of the carbon-containing source at elevated temperature. Removing the metal catalyst can be via, for example, an etchant, such as by immersing, exposing or otherwise contacting the graphene-encapsulated, metal catalyst-coated material with a solution including the etchant.

Figure 17:
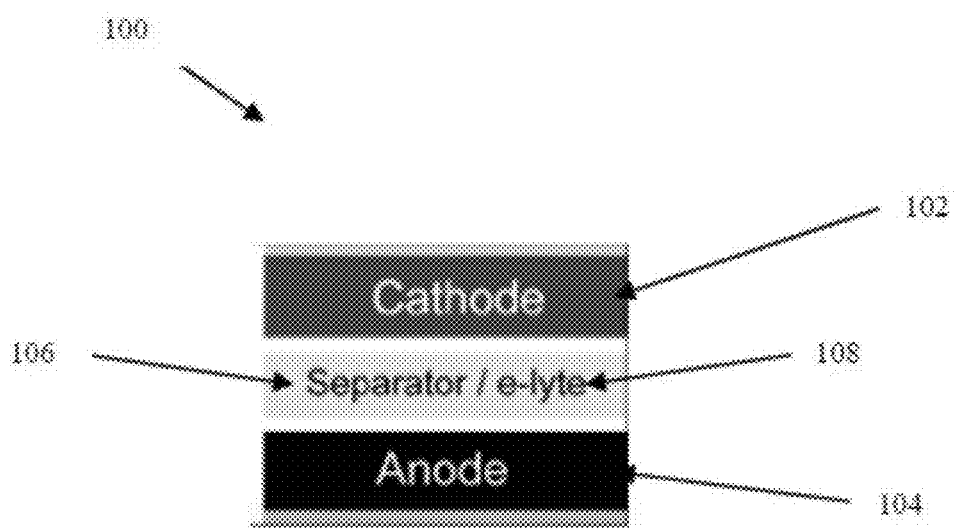
FIG. 17: Schematic of a battery including a graphene-encapsulated material.

The conformal graphene-encapsulated materials described herein can be used for a variety of batteries and other electrochemical energy storage devices. For example, the conformal graphene-encapsulated materials can be included in electrodes for lithium-ion batteries or other types of batteries. As shown in an embodiment of FIG. 17, a resulting battery 100 can include a cathode 102, an anode 104, and a separator 106 that is disposed between the cathode 102 and the anode 104. The battery 100 also can include an electrolyte 108, which is disposed between the cathode 102 and the anode 104. The anode 104 can include graphene-encapsulated silicon (or other graphene-encapsulated anode active material), and the cathode 102 can be a conventional cathode used in Li-ion batteries, Li—$O_2$ batteries, or Li—S batteries. The anode 104 can be substantially devoid of conductive additives; for example, the anode 104 can consist essentially of, or can consist of, a combination of the graphene-encapsulated anode active material, a suitable binder, and a current collector. Graphene-encapsulated structures of other electrochemically active materials can be included within the cathode 102 of some embodiments.

EXAMPLE

The following example describes specific aspects of some embodiments of this disclosure to illustrate and provide a description for those of ordinary skill in the art. The example should not be construed as limiting this disclosure, as the example merely provides specific methodology useful in understanding and practicing some embodiments of this disclosure.

This example sets forth an improved strategy to utilize micron-sized Si particles (SiMPs with sizes of, for example, about 1-3 µm) as a low-cost source of battery electrode materials. The approach is to directly grow a conformal graphene cage onto SiMP with some pre-designed empty space to confine particle fracture and mitigate against electrolyte infiltration. Without a conformal coating, organic electrolyte would contact and react with Si uncontrollably, resulting in an unstable SEI. With the graphene cage protecting SiMP, excellent battery performance is demonstrated: stable cycling (e.g., at least about 85% capacity retention after 300 cycles), large areal capacity loading (e.g., at least about 5.2 mAh/cm$^2$), and high first-cycle (e.g., at least about 93.2%) and later-cycle (e.g., at least about 99.9%) Coulombic efficiencies.

FIG. 1a shows the challenges of utilizing SiMPs. Si particles larger than about 150 nm and Si nanowires larger than about 250 nm have been shown to fracture during lithiation. During lithiation, SiMP would be broken into small nano-sized Si particles, losing electrical contact with each other and increasing overall surface area to form additional SEI. To allow stable cycling of SiMPs, the conformal growth of a conductive graphene cage is introduced as a desirable encapsulation material for improving SiMP battery performance (FIG. 1b). The graphene cage structure imparts its desirable properties to Si, affording the following advantages: (1) Despite particle fracture of SiMP, the mechanically strong and flexible graphene cage with a pre-engineered empty space remains undamaged and confines substantially all of the broken Si pieces within the cage. When using multi-layered graphene, the gliding motion between individual graphene layers during SiMP volume expansion can facilitate the caging effect without breaking. (2) The electrical contact between fractured Si particles within each conducting graphene cage is preserved. (3) The graphene cage's intrinsically high electrical conductivity and ionic permeability through defects allow SiMPs to be electrochemically active. (4) The SEI is expected to form mainly on the graphene cage if there is no significant electrolyte leaking through the conformal cage. Despite the potential existence of some defects, the surface chemistry of the graphene cage is similar to that of graphite, allowing stable SEI formation on graphite and resulting in high first and later-cycle Coulombic efficiency.

Figure 6:
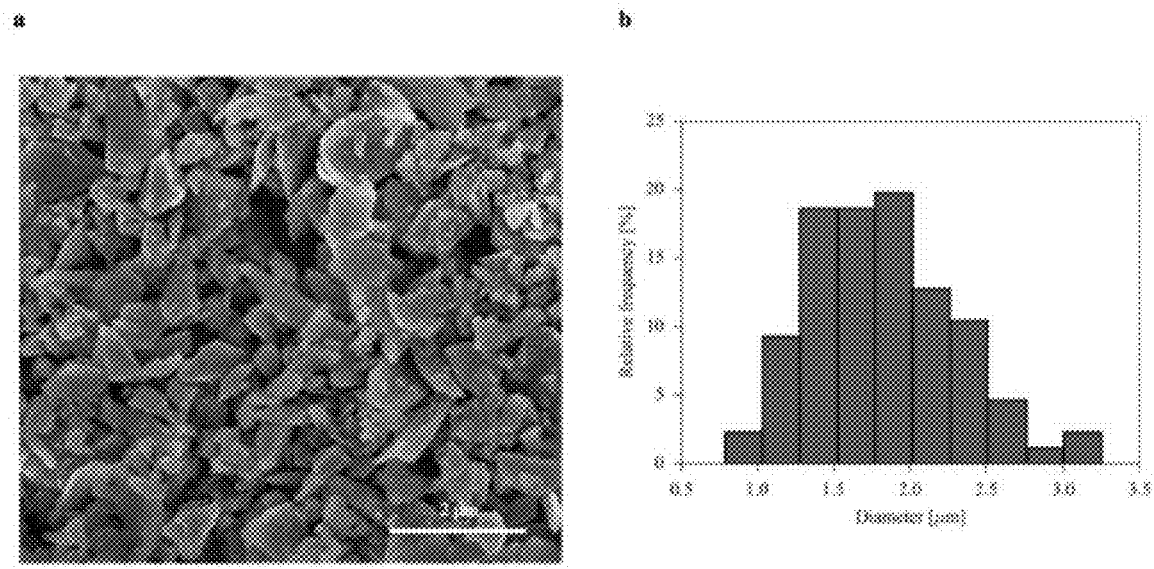
FIG. 6: a, SEM image of bare SiMP. Note the highly non-uniform distribution of size and shape. b, Size distribution statistics of bare SiMP.

It is noted that the graphene cage approach is fundamentally different from other approaches of graphene coatings. Instead of relying on physical mixing or chemical vapor deposition of Si in graphene flakes for an incomplete and non-conformal graphene coverage, the graphene cage approach involves directly growing the graphene cage onto Si particles in a conformal manner. Moreover, this versatile strategy is successful for Si microparticles with extremely non-uniform distributions of size and shape (See FIG. 6). This results in a highly conformal graphene cage with a built-in and tunable void space. The graphene cage approach here is also different from nanostructured Si carbon yolk-shell and pomegranate structures based on the following two aspects: (1) fracture prone micron-sized Si particles; (2) highly graphitic carbon to increase SEI stability and Coulombic efficiency.

Synthesis and Characterization of Graphene Cage

Figure 2:
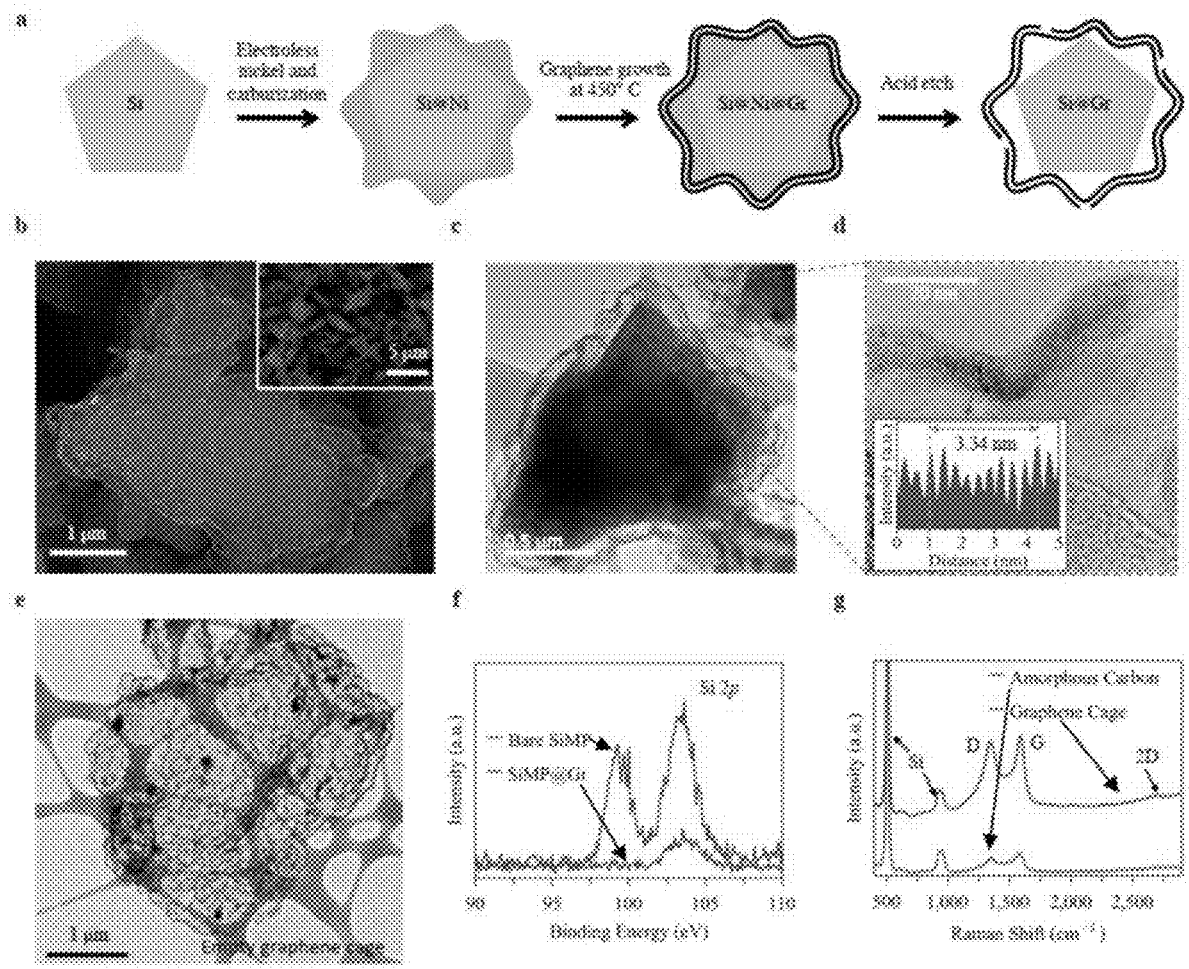
FIG. 2: Synthesis and characterization of graphene cage structure. a, Schematic of dual-purpose nickel (Ni) template synthesis. b, Scanning electron microscopy (SEM) image of a graphene-encapsulated Si microparticle (SiMP@Gr). The inset gives a broader view, showing many Si microparticles encapsulated by the graphene cage. c, Transmission electron microscopy (TEM) image of an individual particle of SiMP@Gr. d, High resolution TEM image of the graphene cage's layered structure. The intensity plot shows that 10 layers span a distance of about 3.34 nm (average inter-layer distance: about 0.334 nm), an indication of graphene layers. e, TEM image of the hollow graphene cage after etching Si in NaOH. f, X-ray photoelectron spectroscopy (XPS) pattern of Si 2p peaks of bare and graphene-encapsulated SiMP. The Si 2p peak is dramatically decreased with the graphene cage indicating a conformal coating. g, Raman spectra of amorphous carbon-coated (SiMP@aC) and graphene-encapsulated SiMP.
Figure 7:
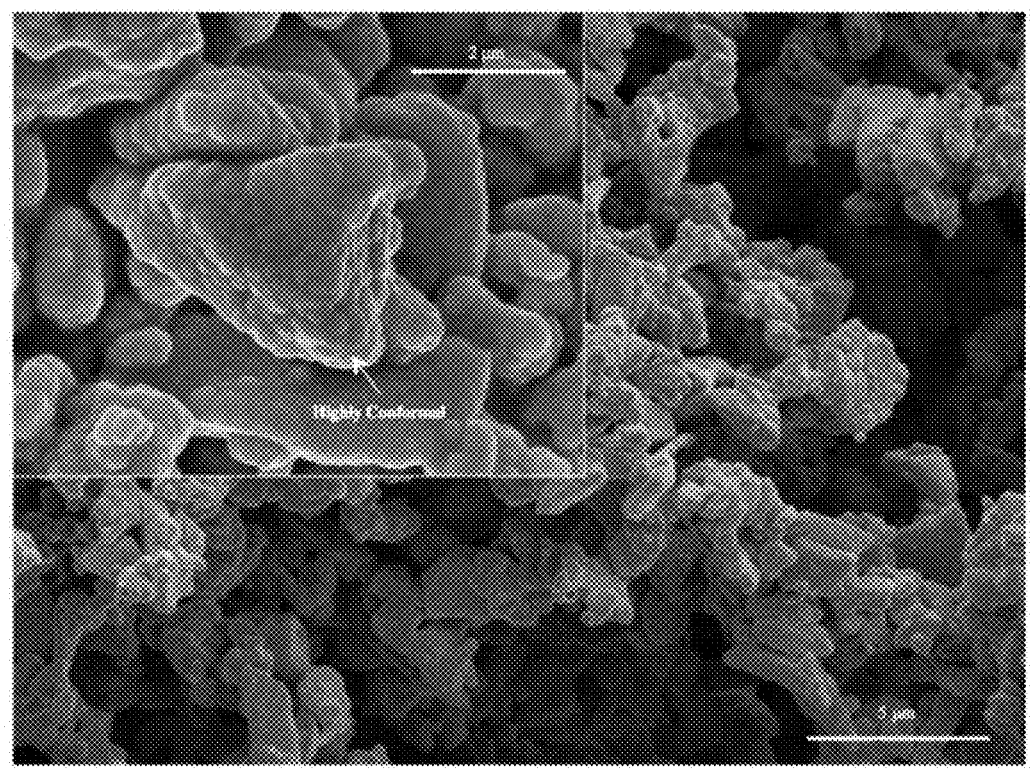
FIG. 7: SEM image of Ni-coated SiMP. Inset is a higher magnification SEM image showing conformal Ni coating despite highly non-uniform size and shape distribution of SiMP.
Figure 9:
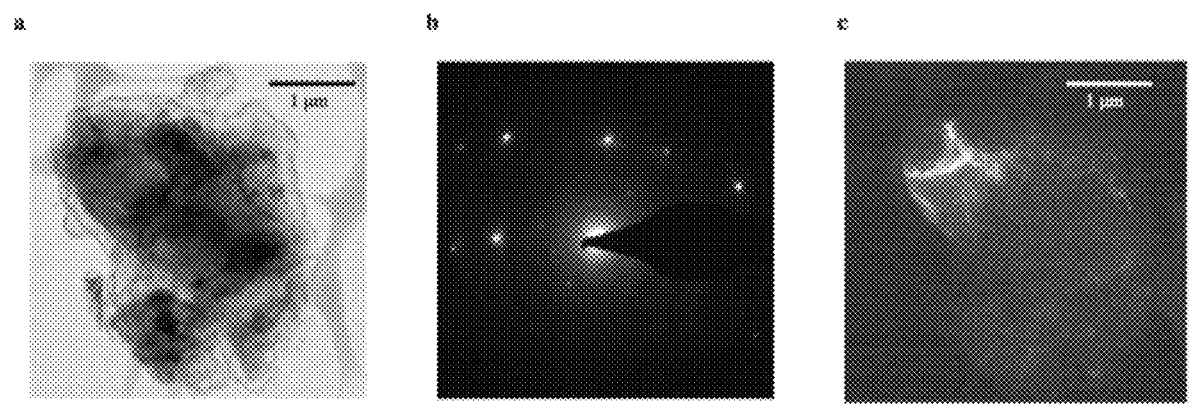
FIG. 9: a, TEM image of SiMP@Gr. b, Selected area diffraction of SiMP@Gr shows crystalline structure of silicon. c, Dark field TEM shows location where diffraction pattern from (b) originates.
Figure 10:
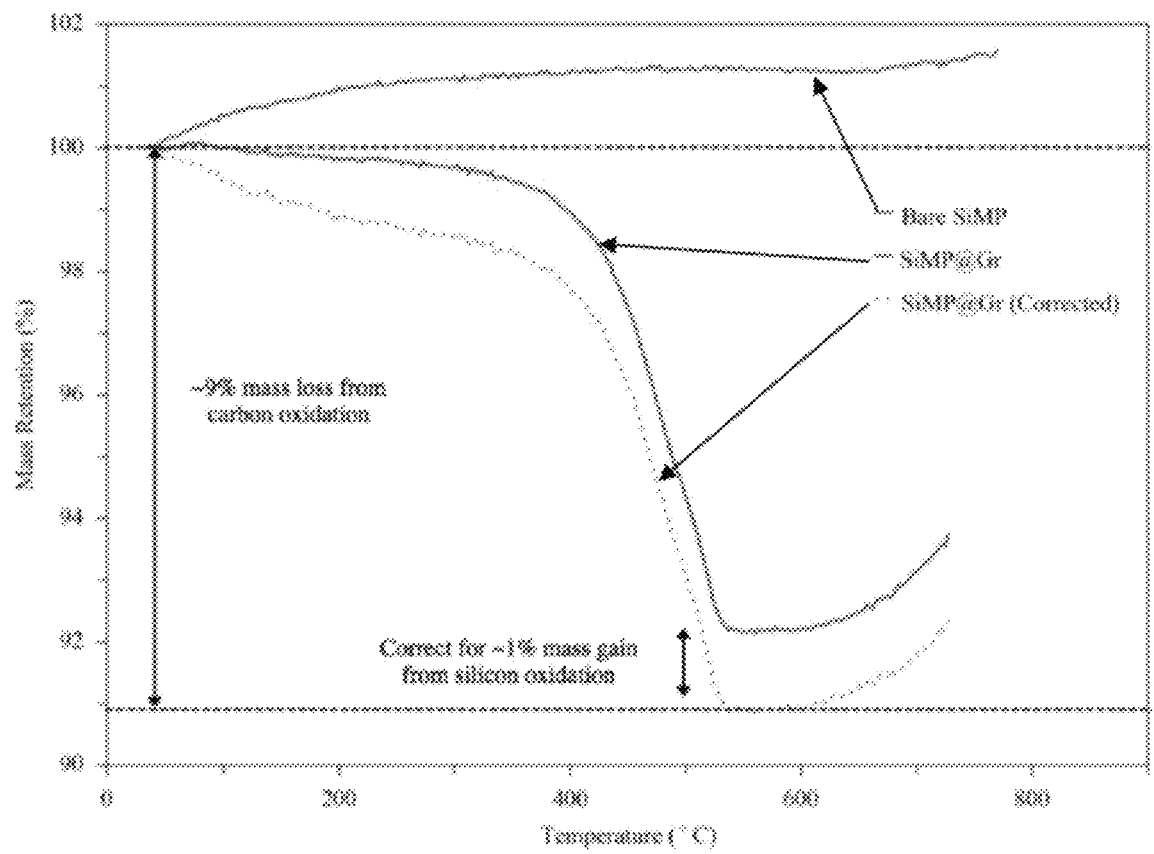
FIG. 10: Thermogravimetric analysis (TGA) of bare and graphene-encapsulated SiMP in about 80% argon and about 20% oxygen. Mass loss is due to carbon oxidation of the graphene cage into gaseous species. Taking slight Si oxidation into account, the graphene cage accounts for about 9% of the composite's weight.
Figure 15:
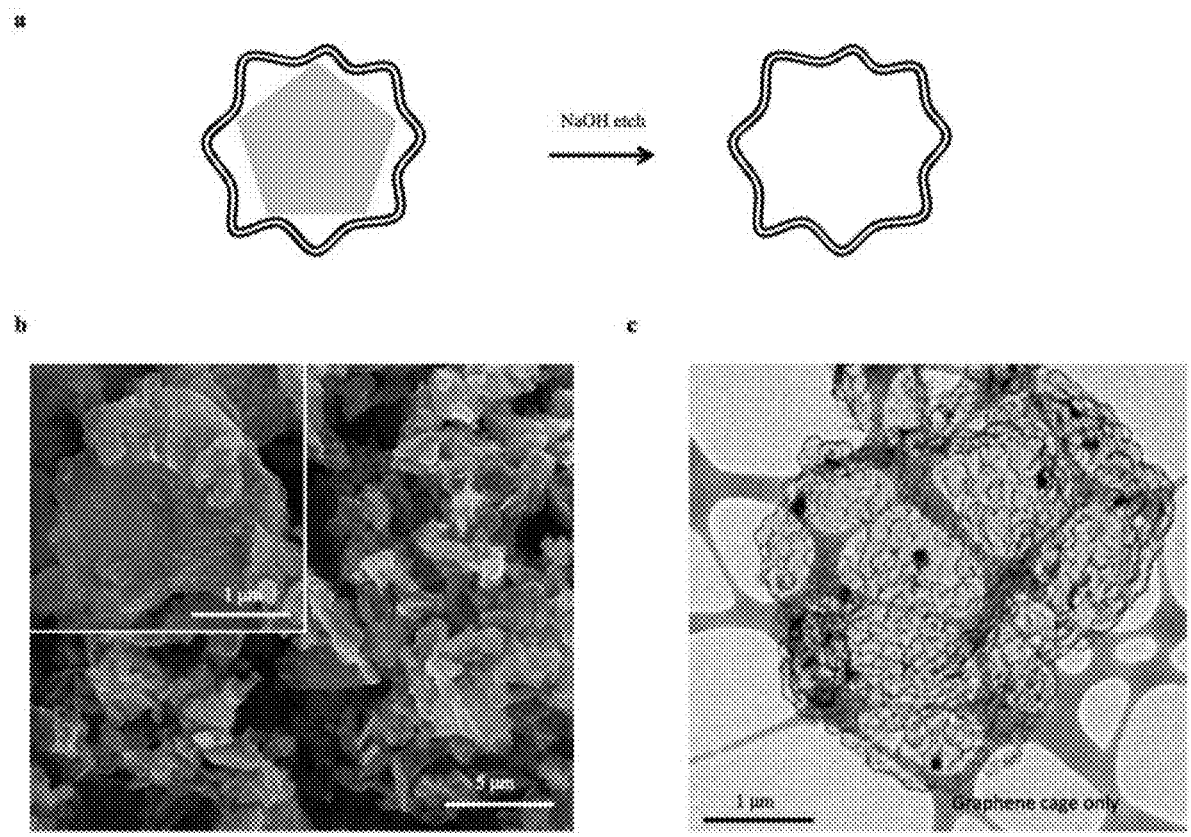
FIG. 15: a, Schematic of sodium hydroxide etching (about 2 M NaOH for about 4 h) of SiMP@Gr. The self-supporting graphene cage remains intact after etching. b, SEM image of empty graphene cage (scale bar: 5 μm). Inset shows stable morphology (scale bar: 1 μm). c, TEM image of empty graphene cage (Scale bar: 1 μm). The strong and flexible framework maintains its structural integrity despite no interior Si to support its shape.

The graphene cage encapsulation should be highly conformal in order for Si to inherit the remarkable properties of graphene. Internal empty space is also desirable for Si expansion and fracture within the graphene cage. To this end, a synthesis approach is developed using a dual-purpose Ni template. The Ni serves as both a metal catalyst for graphene growth and the sacrificial layer for providing void space (FIG. 2a). Using electroless deposition, SiMPs are conformally coated with Ni, the thickness of which can be tuned for the appropriate void space. Next, a benign carburization process activates the Ni-coated SiMP for low-temperature (e.g., about 450° C.) graphene growth via a dissolution-precipitation mechanism. Lastly, the Ni catalyst is etched away using $FeCl_3$ aqueous solution, opening up the void space for SiMP expansion within the graphene cage (FIGS. 2b, c, and FIG. 9). The multi-layered structure of the graphene cage (e.g., about 10 nm in thickness) is observed from the transmission electron microscopy (TEM) image (FIG. 2d). Note that the cage exhibits a wavy structure due to conformal graphene growth along the large grains of Ni deposited onto the SiMP (See FIG. 7). The mechanically robust graphene cage remains continuous throughout the curved regions, which act as a buffer to accommodate acute interior stresses during particle fracture. Even after complete removal of Si by NaOH aqueous solution, the self-supporting graphene cage still remains structurally stable (FIG. 2e, and FIG. 15). Raman spectroscopy reveals the highly graphitic nature of the cage as compared with amorphous carbon synthesized based on other approaches (FIG. 2g). The pronounced D band with narrow bandwidth indicates that sufficient defects are present to facilitate Li ion transport to Si. Furthermore, the considerably screened Si peak (FIG. 2f) from X-ray photoelectron spectroscopy (XPS) provides evidence for the conformal nature of the graphene cage, which makes up just about 9% of the composite's total mass (See FIG. 10). With less carbon content, the graphene cage reduces the possibility of irreversibly trapping Li ions without compromising the specific capacity of the composite.

Electrical and Mechanical Behavior of Graphene Cage

Figure 3:
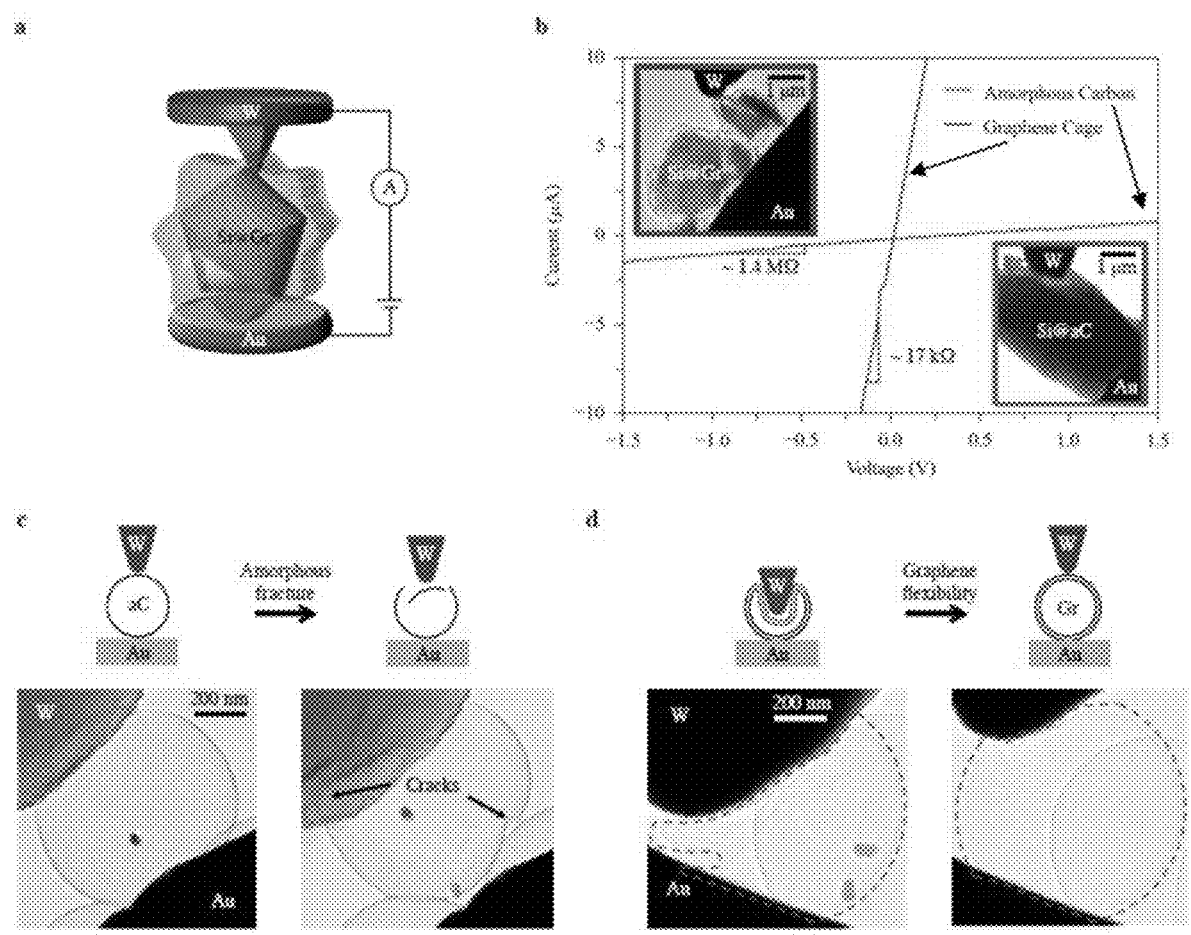
FIG. 3: Particle-level electrical and mechanical characterization of graphene cage by in situ TEM. a, Diagram of an electrical circuit for current-voltage measurements and external load testing. b, Current-voltage data of graphene-encapsulated and amorphous carbon-coated SiMP. Insets are live TEM images of their respective contact positions: graphene cage in upper left border and amorphous carbon coating in low right border. The ohmic behavior shows that the graphene cage's electrical resistance (about 17 k$\Omega$) is a hundredfold less than that of the amorphous carbon coating (about 1.4 M$\Omega$). c, Schematic and time-lapse TEM images of external load testing on empty shells of amorphous carbon. After a slight deformation, the brittle amorphous carbon shell cracks, destroying its spherical structure. d, The graphene cage exhibits good flexibility during an external load. Its shape can be fully collapsed during compression and returns undamaged to its original structure after de-loading.

To substantiate the impressive characteristics of the graphene cage, its electrical and mechanical behavior is examined on the single particle level using a piezo-controlled, electrical biasing TEM-atomic force microscopy (AFM) holder. A circuit was built by sandwiching the graphene-encapsulated SiMP between a conducting gold (Au) substrate and a sharp tungsten (W) tip (FIG. 3a). Monitoring the live TEM image (FIG. 3b inset) ensured good electrical contact. By measuring current as a function of applied voltage (FIG. 3b), the electrical resistance of the graphene cage is determined (about 17 k$\Omega$) to be about hundredfold less than that of an amorphous carbon coating (about 1.4 M$\Omega$) synthesized according to other approaches. This is a remarkable result when considering the low-temperature synthesis of the graphene cage (about 450° C.) is actually lower than that of the amorphous carbon (about 800° C.). The electrically conductive graphene-encapsulated SiMP can allow electrical connectivity through even thick electrodes constructed free of any conductive additives.

With the same experimental configuration, the piezo-controllers are used to apply an external load onto empty cages of graphene and amorphous carbon to observe their mechanical deformation in situ. From FIG. 3c, it is observed that the fragile amorphous carbon sphere cracks and breaks after a slight deformation. This brittleness constrains its ability to contain microscale Si's violent particle fracture. In contrast, the graphene cage exhibits resilience to an external load (FIG. 3d) due to its mechanical strength and flexibility. The graphene cage is able to fully collapse its shape during compression, and it returns to its original structure intact after the load is removed. Coupled with its superb electrical conductivity, these distinct qualities of the graphene cage make it well-suited to address silicon's challenges during lithiation and delithiation.

In Situ Lithiation of Graphene-Encapsulated SiMP

Figure 4:
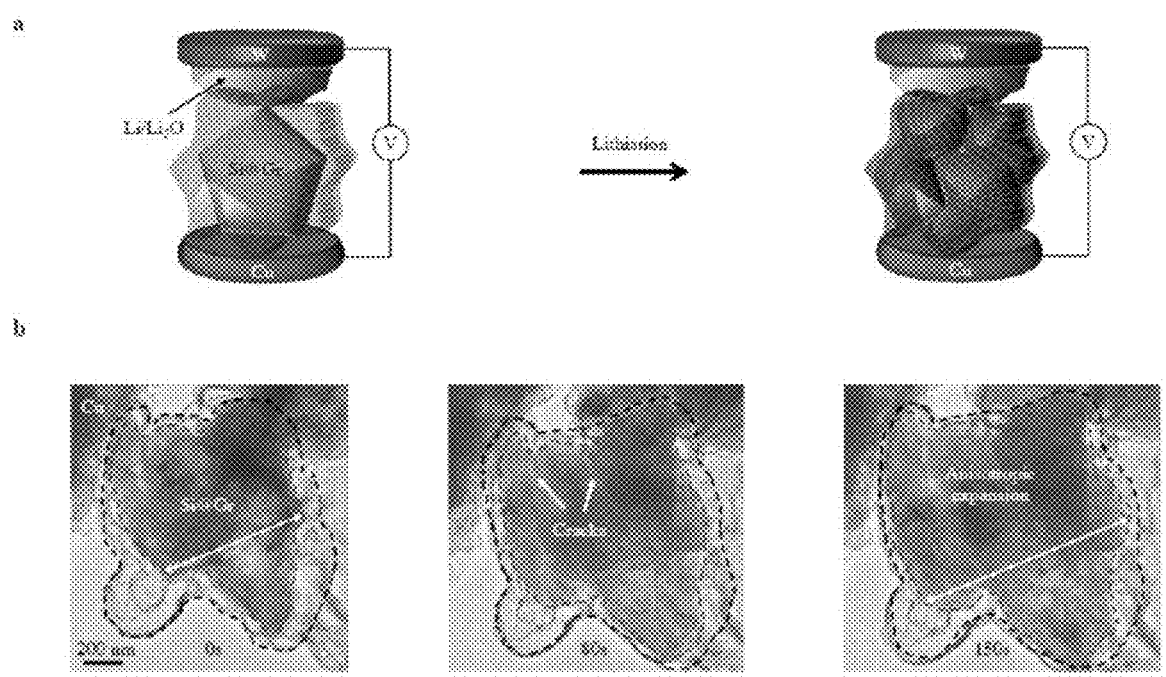
FIG. 4: In situ TEM observation of graphene cage Si lithiation. a, Diagram of the nanoscale electrochemical cell for in situ (de)lithiation. b, Time-lapse images of the lithiation of graphene-encapsulated SiMP. The Si microparticle (outlined) fractures abruptly and violently within the mechanically strong graphene cage (outlined), which remains intact throughout the highly anisotropic process.

The lithiation process of the graphene-encapsulated SiMP is revealed in situ by using a nanoscale electrochemical cell inside the TEM equipment (FIG. 4a). These experiments allow direct observation of silicon's intrinsic volume expansion and particle fracture during battery operation. From FIG. 4b, the SiMP appears to expand slowly until the particle finally fractures in a vigorous fashion. Despite the abrupt and violent rupture of the interior Si, the graphene cage preserves its structural integrity throughout the process, unlike amorphous carbon, which has been shown to readily crack. It is noted that the volume expansion appears highly anisotropic, indicative of crystalline silicon's tendency to favor expansion in certain crystallographic directions over others. This microscale anisotropic expansion is a primary reason why other secondary coatings are impractical for SiMP. Non-uniform void space would have to be exactly engineered along the specific crystallographic directions where expansion is favored; otherwise, the rigid and fragile coating would break. In contrast, the graphene cage is shown to be mechanically strong and flexible. This allows it to survive the large interior stresses during microscale silicon's anisotropic expansion and particle fracture, while still retaining electrical contact between the fractured particles.

Electrochemical Performance

The graphene cage's mechanical strength and electrical conductivity allow SiMP, a previously impractical anode material, to have outstanding battery performance. Specifically, the following can be achieved: (1) long cycling stability, (2) high areal/specific capacity, and (3) high initial and later-cycle Coulombic efficiency without using any conductive additives. From these data, the chemical stability of the graphene cage is also apparent. Type 2032 coin cells were constructed (see methods) for deep galvanostatic cycling tests from about 1 to about 0.01 V. Reported capacities are based on the total mass of Si and C in the graphene cage composite.

Figure 5:
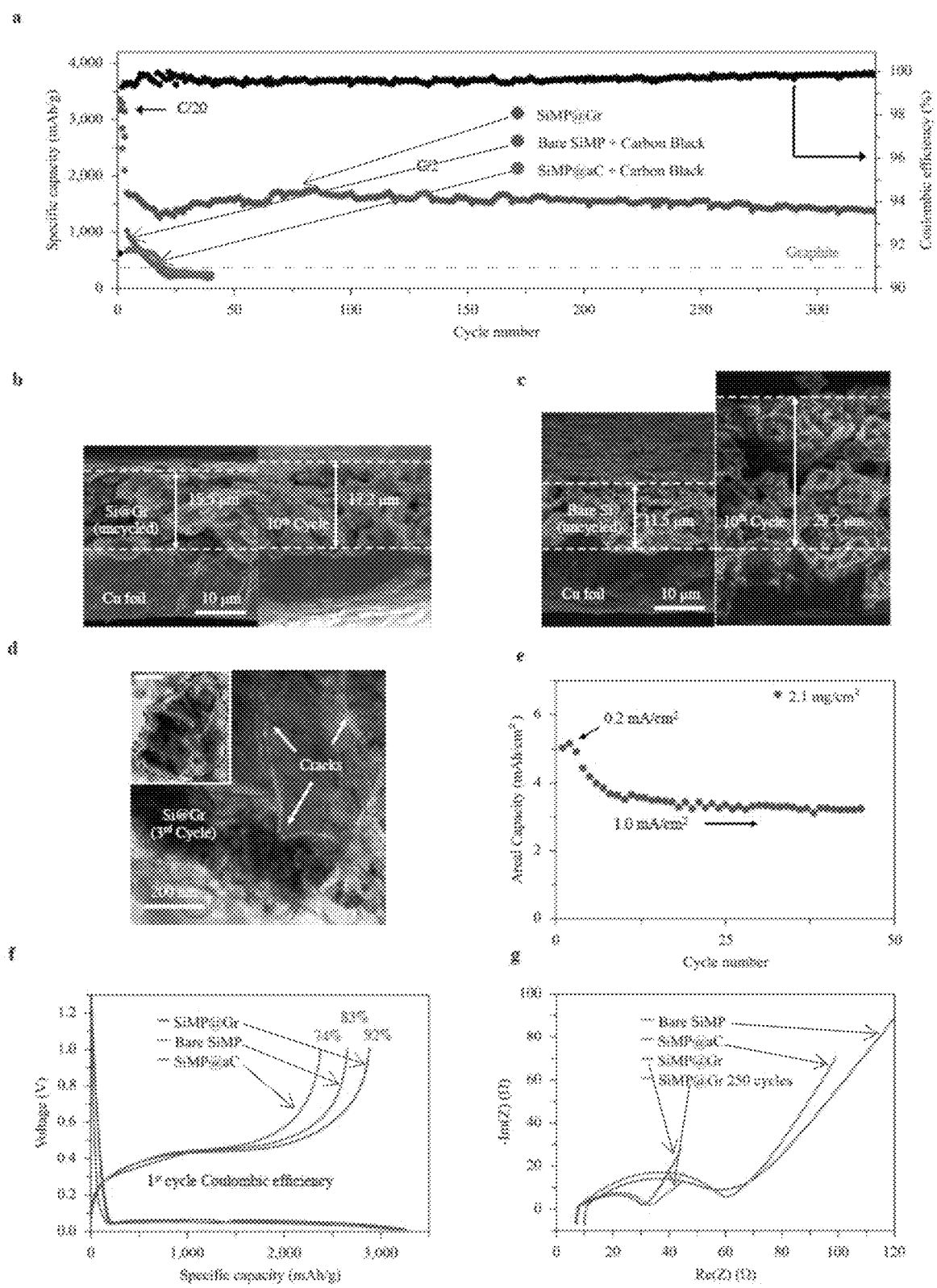
FIG. 5: Electrochemical characterization of graphene cage Si anodes. Specific capacities are reported based on the total mass of active materials (Si and C). a, Reversible delithiation capacity of graphene-encapsulated SiMP with zero conductive additives. Bare and amorphous carbon-coated SiMP are control samples with carbon black conductive additives. The mass loading of all active materials was about 0.8 mg/cm$^2$. The rate was about C/20 for initial three cycles and about C/2 (about 1.5 mA/cm$^2$) for later cycles (1 C=4.2 A/g Si). Theoretical capacity (370 mAh/g) of graphite electrode is shown in horizontal dashed line. Coulombic efficiency of the graphene-encapsulated SiMP is plotted on the secondary y-axis. b, c, Cross-sectional SEM images of graphene-encapsulated (b) and bare (c) SiMP electrodes before (left) and after (right) cycling. d, Ex situ TEM image of graphene-encapsulated SiMP after 3 cycles. White arrows indicate particle fracture is confined within the graphene cage. Inset shows graphene cage (outlined) remains fully intact. e, High-mass-loading cells (about 2.1 mg/cm$^2$) with high areal capacity (about 5.2 mAh/cm$^2$) of graphene-encapsulated SiMP cycled at about 0.2 mA/cm$^2$ for initial three cycles and about 1.0 mA/cm$^2$ for later cycles. f, First-cycle voltage profiles of individual cells with corresponding Coulombic efficiencies. For statistics on Coulombic efficiencies, see FIG. 12. g, Electrochemical impedance spectroscopy (EIS) measurements of graphene-encapsulated, bare, and amorphous carbon-coated SiMP. Note that the graphene cage exhibits faster surface kinetics than bare and amorphous carbon-coated SiMP with no observable change even after 250 cycles.
Figure 11:
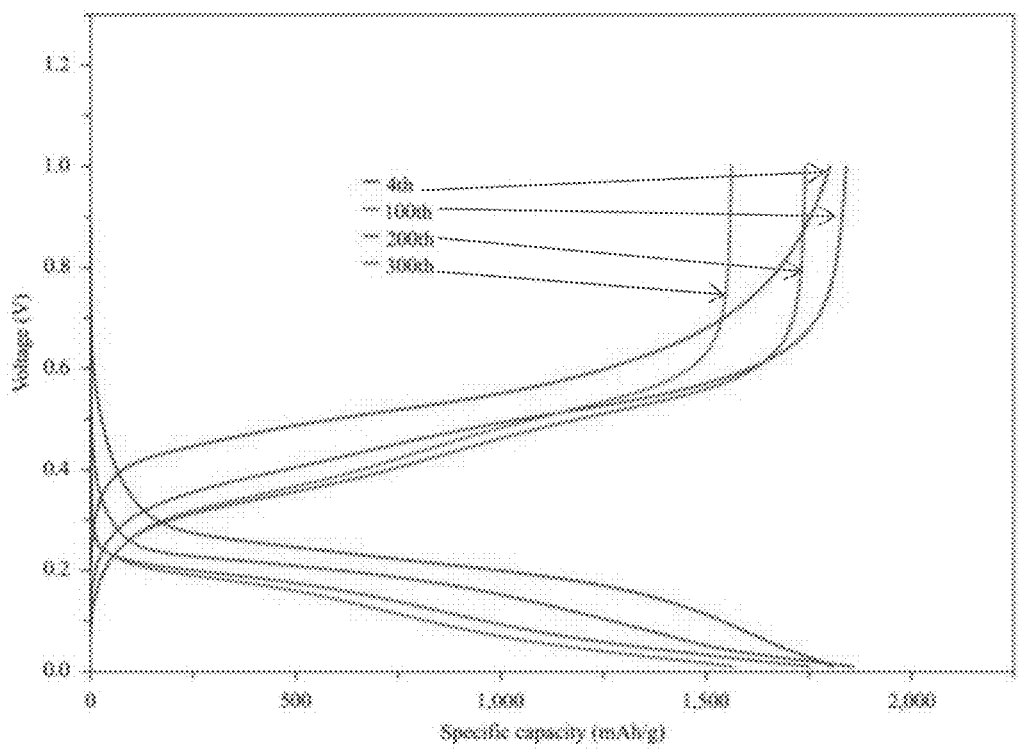
FIG. 11: Voltage profiles of SiMP@Gr at various cycle numbers exhibit typical electrochemical features of Si. After 300 cycles, the graphene-encapsulated SiMP still retains over about 85% of its charge capacity. Under the same cycling conditions, bare and amorphous carbon-coated microscale Si suffered severe capacity decay after 10 and 30 cycles, respectively. For these control experiments, carbon black conductive additives were added to improve electrical connectivity between particles. The capacity decay becomes even worse when these conductive additives are removed.

As shown in FIG. 5a, the reversible capacity of the graphene-encapsulated SiMP reached about 3300 mAh/g at a current density of about C/20 (1 C=4.2 A/g). The high capacity indicates that the active materials are electrically well-connected and fully participate in electrochemical lithiation and delithiation (See FIG. 11). Furthermore, this is achieved without the use of any conductive additives, displaying the excellent electrical conductivity of the graphene cage. From the $4^{th}$ to $300^{th}$ cycle, continued cycling at a higher rate of about C/2 (about 1.5 mA/cm$^2$) resulted in capacity retention of over about 85% for 300 cycles. After that, over about 1400 mAh/g of capacity remained, which is still about four times that of graphite's theoretical capacity. This cycling stability and rate performance is among the best reported for microscale Si to date and far surpasses that of bare or amorphous carbon-coated Si (FIG. 5a).

This cycling stability is attributed to the well-designed graphene cage structure. From the ex-situ TEM images in FIG. 5d, it is observed that the graphene cage stays intact while the fractured microscale Si remains electrically connected on the particle level. Additionally, cross-sectional scanning electron microscope (SEM) images show that the graphene cage's built-in void space prevents large changes in electrode thickness (about 4.5% change in thickness, FIG. 5b), allowing the fractured Si to maintain electrical contact on the electrode level. Without the stabilizing feature of the graphene cage, bare Si microparticles would quickly become electrically disconnected from each other, resulting in unstable particle morphology and catastrophic electrode swelling by about 150% and eventual disintegration (FIG. 5c).

In batteries, maintaining electrical conductivity and connectivity is even more difficult at higher mass loadings because particles in the thicker electrode are increasingly distant from the current collector. Furthermore, small flaws on the particle level may propagate across the thicker electrode and cause significant capacity decay that is usually concealed in lower mass-loading cells. The graphene-encapsulated SiMP also addresses these electrode-level issues, exhibiting areal capacities of about 5.2 mAh/cm$^2$ (FIG. 5*e*). At a mass loading of about 2.1 mg, these cells have specific capacity similar to the lower mass loading cells in FIG. 5*a* (about 0.8 mg), an indication that substantially all of the graphene-encapsulated SiMP is still active at these higher mass loadings. Achieving high-areal-capacity cycling without using any conductive additives is further indication of the graphene cage's intrinsic electrical conductivity and mechanical strength.

Figure 12:
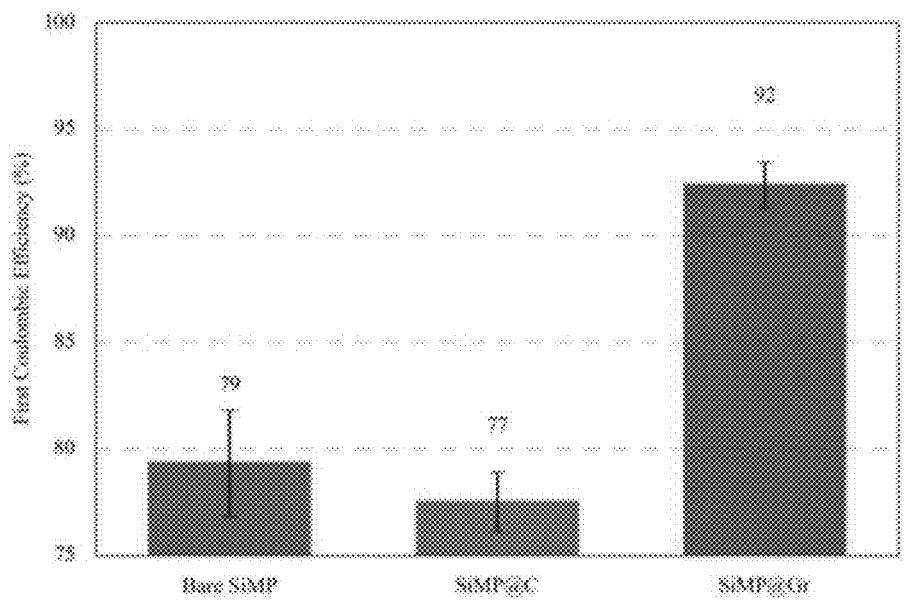
FIG. 12: Statistics of first-cycle Coulombic efficiencies of bare, graphene-encapsulated, and amorphous carbon-coated SiMP. Value above bar indicates average Coulombic efficiency of 10 cells and the error bars denote the standard deviation. On average, the initial cycle Coulombic efficiency is improved by over about 10%.

It is noted that in addition to cycling stability, high Coulombic efficiencies are desirable for the operation of a practical battery. Early cycle Coulombic efficiencies are especially important because they are usually very low and account for most of the Li ion loss and electrolyte consumption during SEI formation. As can be seen in typical voltage profiles (FIG. 5*f*) and compiled coin cell statistics (See FIG. 12), the initial-cycle Coulombic efficiency for bare SiMP is about 83%. This value drops considerably for an amorphous carbon coating (about 74%) due to the high number of dangling carbon bonds acting as lithium trapping sites. Furthermore, even the best performing nanostructured Si anodes typically takes many cycles for the Coulombic efficiency to reach above about 99%. In comparison, the graphene-encapsulated SiMP exhibits initial-cycle Coulombic efficiencies as high as about 93.2% (or more) (See FIG. 12) and quickly increases to about 99.5% (or more) within the first 5 cycles (FIG. 5*a*). After 10 cycles, it reaches about 99.9% (or more). For comparison, the first cycle Coulombic efficiency in commercial graphite anodes is about 90-94% and jumps to about 99.9% in the early cycles.

The improvement in early and later-cycle Coulombic efficiency can be explained in terms of two criteria: (1) surface chemistry should allow for initial SEI formation without consuming too much Li, and (2) interface with electrolyte should be mechanically stable to prevent additional SEI formation. Commercial graphite anodes meet both of these criteria, allowing their tremendous Coulombic efficiency. Similarly, the electrochemical cycling data of the graphene-encapsulated SiMP indicate that the design also meets the criteria for high early and later-cycle Coulombic efficiency.

Firstly, the layered morphology (FIG. 2*d*) of the conformal graphene cage is structurally and chemically similar to that of graphite, making the graphitized carbon atoms of the cage unlikely to trap Li. Furthermore, the use of micron-sized Si (See FIG. 8) lowers the surface area accessible by the electrolyte. Despite possible defects in the graphene cage and the possibility of electrolyte leaking into some of graphene cages, the results show that the graphite-like surface and low surface area of the microscale Si allow the composite to achieve an initial-cycle Coulombic efficiency approaching that of graphite. In later cycles, the mechanically stable graphene cage prevents uncontrolled SEI formation. This is supported by the Nyquist plot obtained from electrochemical impedance spectroscopy (EIS), where the semicircle represents the charge-transfer resistance. The surface kinetics of the graphene-encapsulated SiMP are much faster than that of the bare or amorphous carbon-coated SiMP, and this behavior also remains largely unchanged even after 250 cycles (FIG. 5*g*). Along with about 99.9% Coulombic efficiency in later cycles (FIG. 5*a*), the EIS data provide strong evidence for a stable SEI layer during cycling of the graphene-encapsulated SiMP. These results indicate that the graphene-encapsulated SiMP is a successful design for an active material.

Conclusion

Figure 16:
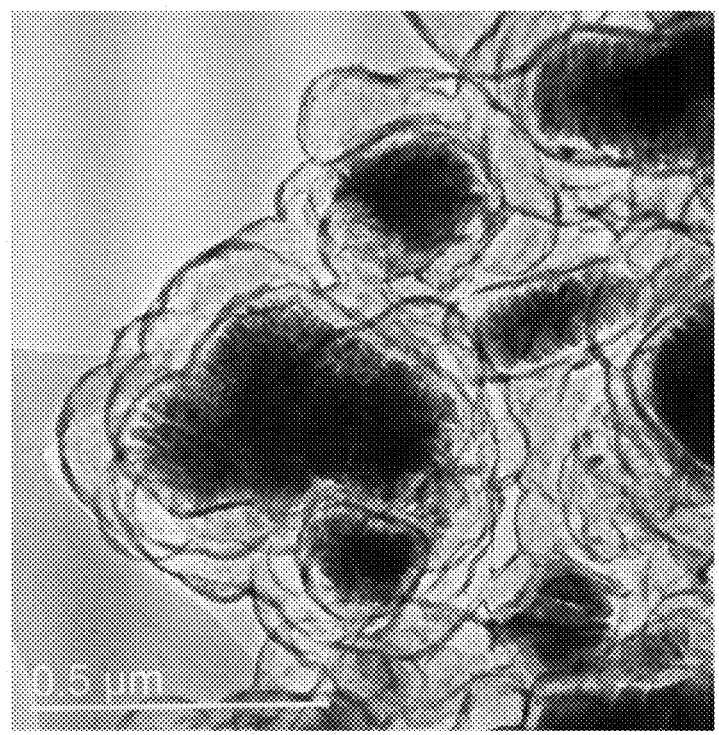
FIG. 16: Graphene cage encapsulating lithium iron phosphate (LFP) (cathode material).

This example sets forth an innovative synthesis approach to encapsulate Si with a graphene cage structure exhibiting a suite of desirable properties. These properties give even microscale Si, a material particularly susceptible to particle fracture and unstable SEIs, great battery performance. Without the use of conductive additives, high capacity cells are cycled (e.g., at least about 1400 mAh/g) over 300 times with excellent initial-cycle (e.g., at least about 93.2%) and later-cycle (e.g., at least about 99.9%) Coulombic efficiency at high current densities (e.g., at least about 1.5 mA/cm$^2$). In addition, the strict design criteria demanded of stable, high-areal-capacity cells (e.g., about 5.2 mAh/g) further validate the graphene cage encapsulation strategy. These values are among the best reported for Si microparticles to date. This strategy can also be expanded to include a wide range of other materials that fail in electrochemical reactions (See FIG. 16 for an example of a graphene cage encapsulating a lithium iron phosphate cathode material). By imparting mechanical strength, electrical conductivity, and chemical stability to the composite, encapsulation by a graphene cage demonstrates a powerful method to address failure modes in electrodes, making energy dense, low-cost battery materials realistic.

Methods

Synthesis. As depicted in FIG. 2*a*, a dual-purpose template approach is used to synthesize graphene-encapsulated SiMP with built-in void space. Surface-activated SiMPs were first placed in an electroless Ni bath at room temperature for about 30 min. The thickness of the Ni coating can be tuned to provide the appropriate void space. The Ni-coated SiMP powder was then immersed in triethylene glycol (or other carbon source) for about 8 h at about 185° C. This carburization operation activates the Ni catalyst for graphene growth via a dissolution-precipitation mechanism at about 450° C. under argon (Ar) for about 1 h. Finally, the Ni catalyst and native SiO$_2$ layer were sequentially etched in about 1.0 M FeCl$_3$ and about 10% HF solution (or other etchant), respectively. The amorphous carbon coating was synthesized by pyrolysis based on previous work. For more details, see Supplementary Information.

Figure 14:
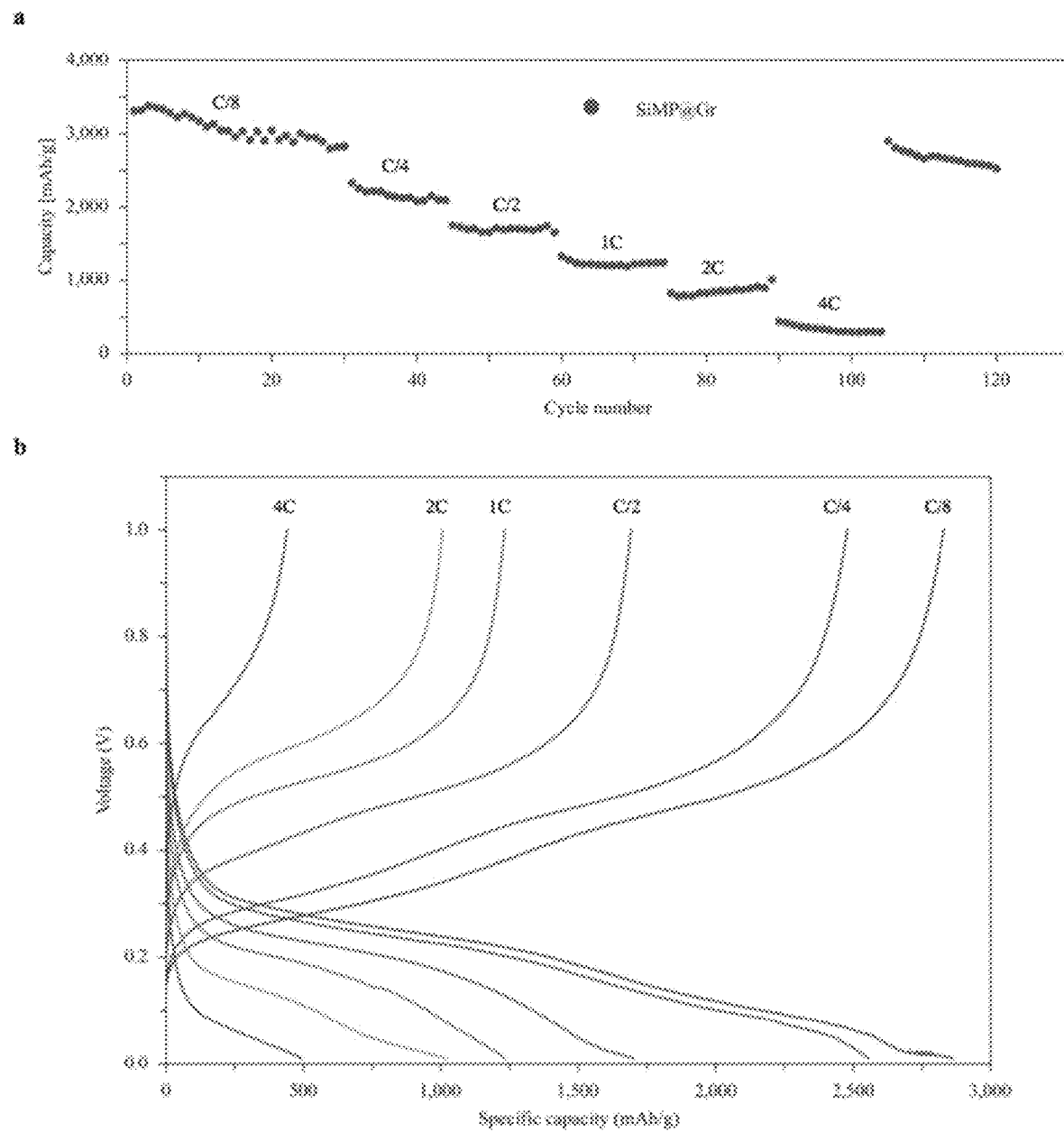
FIG. 14: a, Galvanostatic cycling performance of SiMP@Gr at different current densities (C=4.2 Ah/g). Even without conductive additives, a specific capacity of about 500 mAh/g is achieved at a rate of about 4 C. Impressively, this is comparable to Si nanoparticle rate performance. b, Voltage profiles at different current densities.

In-situ TEM. A piezo-controlled, electrical biasing TEM-AFM holder (Nanofactory Instruments) was used to observe the (de)lithiation process of graphene-encapsulated SiMP and measure the graphene cage's electrical and mechanical properties. Li metal and SiMP@Gr were dispersed onto about 0.25 mm W and copper (Cu) wires, respectively, and were then brought into contact by the piezo-controller. By applying a voltage bias of about −3 V, Li ions flowed through the Li metal's native oxide/nitride to alloy with Si at the working electrode. The graphene cage remained intact despite the violent anisotropic fracture of the SiMP. To determine the graphene cage's current-voltage behavior, SiMP@Gr was dropcast onto an about 0.25 mm Au wire. A bare W wire with a sharp tip was used to contact the graphene cage, completing the circuit. Measuring current as a function of applied voltage confirms that the graphene cage is over 2 orders of magnitude more electrically conductive than amorphous carbon. This obviates the need for conductive additives in electrochemical cells, and it also affords great rate performance (See FIG. 14). For external load testing, the piezo-controller was used to push the W tip into the graphene cage. The reversible deformation makes it a suitable encapsulation material for anisotropic SiMP expansion and fracture.

Figure 13:
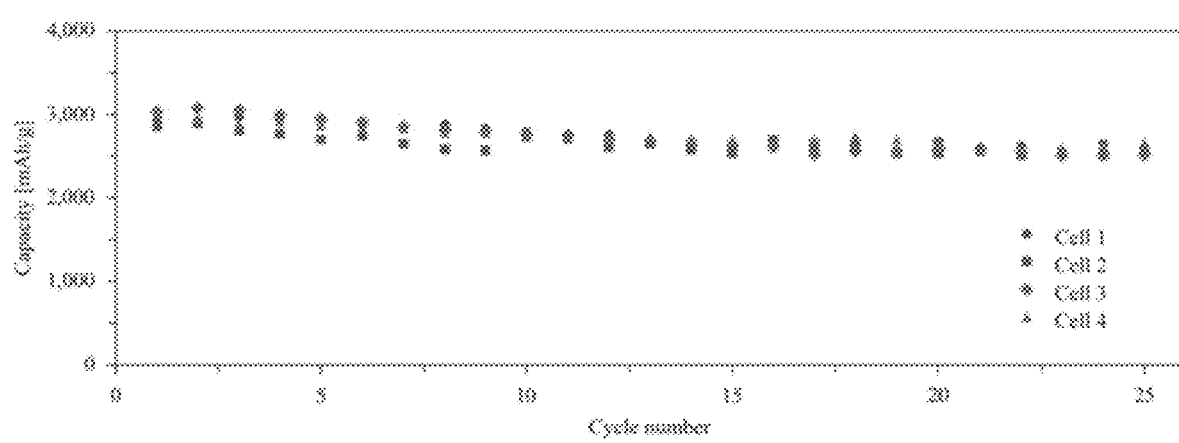
FIG. 13: Deep galvanostatic cycling performance of 4 SiMP@Gr coin cells with no rate change at about C/8 (C=4.2 Ah/g). Stable cycling behavior is achieved despite the absence of conductive additives.

Electrochemistry. SiMP@Gr working electrodes for cycling stability (FIG. 5a, FIG. 13), rate capability (FIG. 14), and high areal capacity tests were prepared using a conventional slurry method. SiMP@Gr powders and polyvinylidene fluoride (PVDF) binder with a mass ratio of about 9:1 were dispersed in N-methyl-2-pyrrolidone (NMP) in the absence of any conductive additives and stirred for about 12 h. Control electrodes with bare SiMP or amorphous carbon-coated SiMP (SiMP@aC) were prepared using the same slurry method, except with about 8:1:1 mass ratio of active material, carbon black conductive additive, and PVDF binder. After casting onto an about 15 µm thick Cu foil and drying at about 50° C. in a vacuum oven, the samples were calendared and cut into about 1 cm² circular disks with a mass loading of about 0.8 mg/cm². These working electrodes were then assembled into type 2032 coin cells with Li metal as the counter/reference electrode. The electrolyte used was about 1.0 M LiPF$_6$ in about 89 vol. % 1:1 w/w ethylene carbonate/diethyl carbonate with about 10 vol. % fluoroethylene carbonate and about 1 vol. % vinylene carbonate. All coin cells were evaluated by galvanostatic cycling between about 0.01 and about 1 V versus Li/Li$^+$. The specific capacity for all cells was calculated using the total mass of the graphene-encapsulated SiMP composite. Charge/discharge rates were calculated assuming silicon's theoretical capacity (4200 mAh/g). Coulombic efficiency was calculated using the ratio of delithiation ($C_{dealloy}$) capacity to lithiation ($C_{alloy}$) capacity ($C_{dealloy}/C_{alloy} \times 100\%$).

Supplementary Information

Activating SiMP for Electroless Ni Deposition

Silicon's surface is densely coated with a nucleation seed (palladium (Pd) in this case) for a conformal Ni coating. Polydopamine (about 3 nm) is used as a surface-adherent layer to sensitize the Si surface with Sn(II) ions, which will subsequently reduce the Pd metal seed from solution onto Si.

In a typical synthesis, about 2 g SiMP (about 1-3 µm; US Research Nanomaterials, Inc.) were dispersed in about 160 mL of deionized (DI) water and sonicated for about 10 min. About 1.6 mL of Tris-buffer (about 1.0 M; pH of about 8.5; Teknova) and about 320 mg dopamine hydrochloride (Sigma-Aldrich) were sequentially added to the aqueous solution and stirred at room temperature for about 1 h. This will form a very thin layer of polydopamine that will help the Ni-nucleation seed adhere more readily to the silicon surface. Next, about 5 mL of stannous chloride aqueous solution (about 5 g/L SnCl$_2$; about 10 mL/L hydrochloric acid (HCl); Sigma-Aldrich) is directly added to the mixture and stirred for an additional about 1 h. The decrease in pH prevents the polydopamine layer from growing thicker. The sample is then collected by centrifugation and washed three times with DI water. Finally, the particles are immersed in about 15 mL of palladium chloride aqueous solution (about 0.5 g/L PdCl$_2$; about 6.25 mL/L HCl; Sigma-Aldrich) and stirred for about 1 h. Washing 3 times with DI water and collecting by centrifugation results in activated SiMP.

Electroless Ni Deposition

The thickness of the Ni coating can be tuned by either changing the concentration of the electroless Ni (EN) solution or controlling the number of deposition reactions. In this case, a combination of both was used. Two electroless Ni solutions were prepared: a primary solution (about 20 g/L nickel sulfate hexahydrate; about 10 g/L sodium citrate dihydrate; about 5 g/L lactic acid) and a secondary solution with double the component concentration (about 40 g/L nickel sulfate hexahydrate; about 20 g/L sodium citrate dihydrate; about 10 g/L lactic acid). Activated SiMP will be sequentially immersed in these EN solutions.

Prior to the first electroless deposition, about 1 g of dimethylamine borane (DMAB; Sigma-Aldrich) and about 2 mL of ammonium hydroxide (NH$_3$.H$_2$O, Sigma-Aldrich, about 28%) were added to about 180 mL of the primary EN solution. The pH-sensitive DMAB serves as the reducing agent during electroless Ni deposition. About 500 mg of activated SiMP are then added to the dilute EN solution and gently stirred for about 30 min. Bubbles will begin to effervesce and the green-colored EN solution should appear lighter in color. After deposition is complete, the SiMP@1× Ni will settle to the bottom. While holding the SiMP@1×Ni particles at the bottom of the container with a magnet, the depleted EN bath is carefully poured out. In a separate container, about 2 g of DMAB and about 3 mL of ammonium hydroxide are added to about 180 mL of the secondary EN solution. This is then added immediately to the damp particles (SiMP@1×Ni) and stirred for about 30 min. The resulting SiMP@2×Ni is washed twice with ethanol and dried in a vacuum oven at about 50° C. for about 1 h.

Carburization, Annealing, and Etching of Dual-Purpose Ni Template

Figure 8:
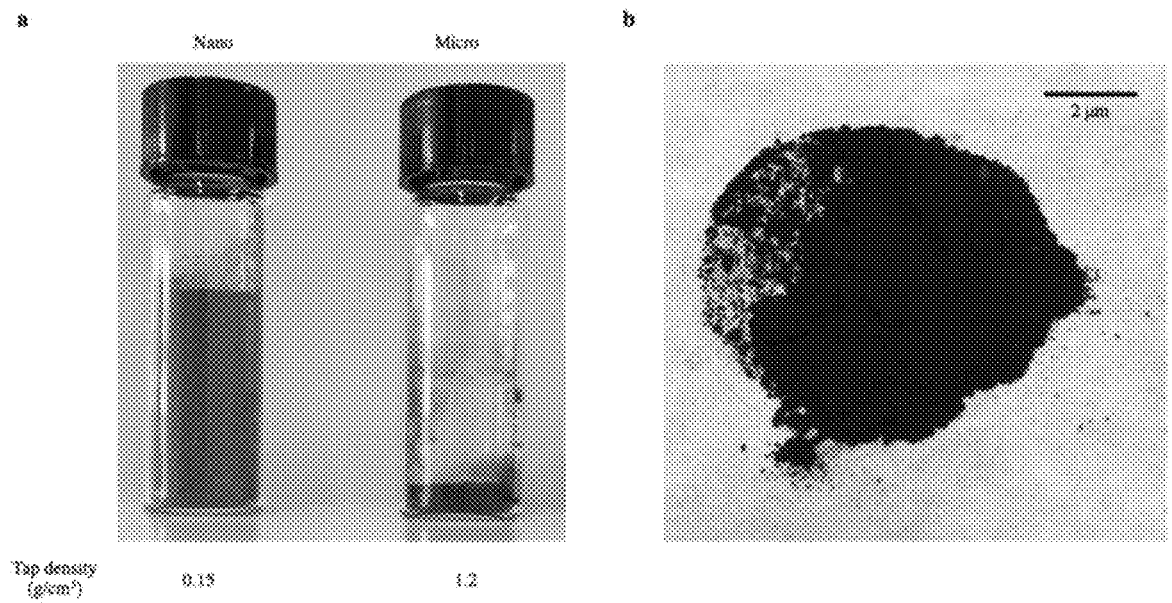
FIG. 8: a, Digital image of bare Si nanoparticles (left) and microparticles (right). Each vial contains about 0.4 g of particles. Note that on the microscale, Si has about 10 times more volumetric capacity than on the nanoscale. b, Digital image of graphene-encapsulated SiMP. The powders were dark black, in contrast to the starting gray color of the bare SiMP.

Dried SiMP@2×Ni (about 2.3 g after EN) is dispersed in about 150 mL of triethylene glycol (Santa Cruz Biotechnology, Inc.) and about 500 µL of about 50% w/w aqueous NaOH solution. After stirring at about 185° C. for about 8 h, the carburized SiMP@2×Ni was collected by centrifugation and washed 3 times with ethanol. The carburization process occurs when the organic solvent decomposes, allowing carbon atoms to diffuse into the Ni layer and adhere to the surface. This primes the SiMP@2×Ni for low-temperature graphene growth. Samples were then dried in a vacuum oven at about 50° C. for about 1 h. The dried particles were placed in a tube furnace with the following temperature profile: heat to about 100° C. at about 2° C./min; heat to about 450° C. at about 20° C./min; hold temperature at about 450° C. for about 1 h. An Ar flow rate of about 80 sccm was maintained throughout the annealing process. The dual-purpose Ni template and native oxide layer on Si were etched by sequentially immersing the annealed particles in about 1 M FeCl$_3$ (about 2 h) and about 10 vol. % hydrogen fluoride aqueous solution (about 30 min), respectively. Graphene-encapsulated SiMP were obtained (about 400 mg) after washing 3 times with ethanol and drying in a vacuum oven at about 50° C. for about 1 h (FIG. 8).

Synthesis of Amorphous Carbon-Coated SiMP

About 500 mg of SiMP were dispersed in about 120 mL water. About 4 mL of Cetrimonium bromide (CTAB, Sigma-Aldrich, 10 mM) and about 0.4 mL ammonia were added and the solution was stirred for about 20 min to ensure the adsorption of CTAB on the silicon surface. Next, about 100 mg resorcinol (Sigma-Aldrich) and about 140 µL formaldehyde solution (Sigma-Aldrich, about 37% wt % in H$_2$O) were added and stirred overnight. The final coated Si was collected by centrifugation and washed with ethanol three times. The coating was carbonized under Ar at about 800° C. for about 2 h.

Materials Characterization

The weight percentage of Si and C in the graphene-encapsulated SiMP was determined from the weight loss curves measured under simulated air atmosphere (about 20% O$_2$+about 80% Ar, both are ultra-purity grade gases from Airgas) on a thermogravimetric (TG)/differential thermal analysis (DTA) instrument (Netzsch STA 449) with a heating rate of about 5° C./min. Under these conditions, mass increases due to slight Si oxidation, whereas carbon oxidation to gaseous species causes mass loss. To decouple these two processes, a bare Si control sample was measured at the same heating conditions (See FIG. 10) and the mass gain was subtracted from the graphene-encapsulated SiMP curve. The Si content in the composite is then the lowest point of the corrected curve (about 91%), leaving about 9% from the carbon in the graphene cage. Other characterization was carried out using SEM (FEI Sirion, Nova NanoSEM), TEM (FEI Tecnai, Titan), XPS (SSI S-Probe Monochromatized, Al Kα radiation at 1486 eV), EIS (BioLogic VMP3), and Raman spectroscopy (Horiba JY).

Electrochemical Characterization

Working electrodes were prepared using a conventional slurry method. SiMP@Gr powders and PVDF (Kynar HSV 900) binder with a mass ratio of about 9:1 were dispersed in NMP in the absence of any conductive additives and stirred for about 12 h. Control electrodes with bare SiMP or SiMP@aC were prepared using the same slurry method, except using a mass ratio of about 8:1:1 for active material, carbon black conductive additive (Super P, TIMCAL, Switzerland), and PVDF binder, respectively. After casting onto an about 15 μm thick Cu foil and drying at about 50° C. in a vacuum oven for about 3 h, the samples were calendared and cut into about 1 cm² circular disks with a mass loading of about 0.8 mg/cm². In an Ar-filled glovebox, these working electrodes were assembled into type 2032 coin cells with a polymer separator (Celgard 2250) and Li metal (Alfa Aesar) as the counter/reference electrode. About 100 μL of about 1.0 M LiPF6 in about 89 vol. % 1:1 w/w ethylene carbonate/diethyl carbonate (BASF Selectilyte LP40) with about 10 vol. % fluoroethylene carbonate and about 1 vol. % vinylene carbonate (Novolyte Technologies) was added as the electrolyte with full wetting of both working and counter electrode surfaces.

Coin cells were loaded into a battery tester (Arbin Instruments) and cycled between about 0.01 and about 1 V versus Li/Li$^+$. The specific capacity for all cells was calculated using the total mass of the graphene-encapsulated SiMP composite. Charge/discharge rates were calculated assuming silicon's theoretical capacity (4200 mAh/g Si). Coulombic efficiency was calculated using the ratio of delithiation ($C_{dealloy}$) capacity to lithiation ($C_{alloy}$) capacity ($C_{dealloy}/C_{alloy} \times 100\%$).

For ex-situ SEM/TEM characterization of working electrodes, coin cells were charged to about 1 V and disassembled. The working electrodes were then rinsed gently in acetonitrile to remove Li salts from the residual electrolyte.

As used herein, the singular terms "a," "an," and "the" include plural referents unless the context clearly dictates otherwise. Thus, for example, reference to an object can include multiple objects unless the context clearly dictates otherwise.

As used herein, the term "set" refers to a collection of one or more objects. Thus, for example, a set of objects can include a single object or multiple objects. Objects of a set can be the same or different.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the terms "connect," "connected," "connecting," and "connection" refer to an operational coupling or linking. Connected objects can be directly coupled to one another or can be indirectly coupled to one another, such as through another set of objects.

As used herein, the term "size" refers to a characteristic dimension of an object. Thus, for example, a size of an object that is spherical can refer to a diameter of the object. In the case of an object that is non-spherical, a size of the non-spherical object can refer to a diameter of a corresponding spherical object, where the corresponding spherical object exhibits or has a particular set of derivable or measurable characteristics that are substantially the same as those of the non-spherical object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations is not a limitation of the disclosure.

What is claimed is:

1. A method of forming a conformal graphene-encapsulated material, comprising:
    coating a battery electrode material with a metal catalyst to form a metal catalyst-coated battery electrode material, wherein coating the battery electrode material with the metal catalyst includes performing electroless deposition of the metal catalyst on the battery electrode material;
    growing graphene on the metal catalyst-coated battery electrode material to form a graphene cage encapsulating the metal catalyst-coated battery electrode material; and at least partially removing the metal catalyst to form a void inside the graphene cage.

2. The method of claim 1, wherein the metal catalyst is nickel.

3. The method of claim 1, wherein growing the graphene includes exposing the metal catalyst-coated battery electrode material to a carbon-containing source, followed by performing carburization and annealing.

4. The method of claim 3, wherein annealing is performed at a temperature in the range of 200° C. to 600° C.

5. The method of claim 3, wherein exposing the metal catalyst-coated battery electrode material to the carbon-containing source includes disposing the metal catalyst-coated battery electrode material in a solution of the carbon-containing source.

6. The method of claim 1, wherein removing the metal catalyst is through the graphene cage.

7. The method of claim 1, wherein removing the metal catalyst is via an etchant.

8. The method of claim 1, wherein the battery electrode material includes silicon.

9. The method of claim 1, wherein the battery electrode material is provided as at least one particle having a dimension in the range of 200 nm to 10 µm.

* * * * *